US009989777B1

(12) United States Patent
Comploi et al.

(10) Patent No.: US 9,989,777 B1
(45) Date of Patent: Jun. 5, 2018

(54) ACCURATE AND BALANCED LIGHTING IN A PEPPER'S GHOST PROJECTION SYSTEM FOR LIVE CINEMATIC PERFORMANCES

(71) Applicant: DISNEY ENTERPRISES, INC., Burbank, CA (US)

(72) Inventors: Dumene Comploi, Los Angeles, CA (US); Przemyslaw Marek Iwanowski, North Hollywood, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days. days.

(21) Appl. No.: 15/613,934

(22) Filed: Jun. 5, 2017

(51) Int. Cl.
*G03B 21/28* (2006.01)
*G02B 27/22* (2018.01)
*G09G 3/00* (2006.01)
*H04N 13/04* (2006.01)
*G03B 21/26* (2006.01)

(52) U.S. Cl.
CPC ..... *G02B 27/2292* (2013.01); *G02B 27/2214* (2013.01); *G02B 27/2235* (2013.01); *G03B 21/26* (2013.01); *G09G 3/003* (2013.01); *H04N 13/0404* (2013.01); *G03B 21/28* (2013.01)

(58) Field of Classification Search
CPC .............. G02B 27/2292; G02B 27/144; G02B 27/2221; G02B 27/22; G03B 21/28; G03B 21/606; G03B 21/62; G03B 21/26; G03B 21/00; G03B 21/562; H04N 13/0443; H04N 13/0459; A63J 5/021
USPC .......................................................... 353/28
See application file for complete search history.

(56) References Cited

U.S. PATENT DOCUMENTS

| | | | |
|---|---|---|---|
| 6,832,125 B2 | 12/2004 | Sonnenberg et al. |
| 6,995,906 B2 | 2/2006 | Edney |
| 7,057,637 B2 | 6/2006 | White |
| 7,397,536 B2 | 7/2008 | Shimizu |

(Continued)

FOREIGN PATENT DOCUMENTS

| GB | 2321565 A | 7/1998 |
|---|---|---|
| WO | 20010031398 A1 | 5/2001 |

OTHER PUBLICATIONS https://www.dpreview.com/forums/thread/1718902, "Light Absorbent Black Background Cloth," Aug. 1, 2006.

(Continued)

*Primary Examiner* — Ryan Howard
(74) *Attorney, Agent, or Firm* — Marsh Fischmann & Breyfogle LLP; Kent A. Lembke (57) ABSTRACT

A display system that is particularly well-suited for use in providing or displaying a live cinematic performance to an audience. The system includes a first space that is directly viewable by the audience and that is illuminated with a stage lighting assembly. Human, robotic, or other physical performers are positioned in the first space and selectively illuminated by light from the stage lighting. The system includes a Pepper's ghost assembly configured to provide enhanced brightness of the projected image as background items in the Pepper's ghost assembly's space are hidden from view by the audience. The Pepper's ghost assembly may include one or more high speed projectors or other light sources, a high speed vision system, and black retroreflective material, and these components function in combination to allow the assembly to be operated to selectively light objects and people in the hidden space without projecting the background to the audience.

20 Claims, 5 Drawing Sheets

(56) References Cited

U.S. PATENT DOCUMENTS

| | | |
|---|---|---|
| 7,420,732 B2 | 9/2008 | Huber |
| 7,468,778 B2 | 12/2008 | Thomas |
| 7,760,229 B2 | 7/2010 | White |
| 8,682,030 B2 | 3/2014 | Large |
| 9,065,966 B2 | 6/2015 | White |
| 2005/0057663 A1 | 3/2005 | Thomas et al. |
| 2006/0098286 A1 | 5/2006 | Sagar et al. |
| 2013/0300637 A1 | 11/2013 | Smits |

OTHER PUBLICATIONS https://www.lynda.com/shooting-video-tutorials/using-duvetyne-fabric/166762/451881-4.html, "Using a duvetyne or fabric," Dec. 16, 2016.

Naef, Martin, "Feasibility of the Living Canvas—Restricting Projection to a Performer on Stage," MM '08, Oct. 26-31, 2008 Vancouver, British Columbia, Canada.

ACCURATE AND BALANCED LIGHTING IN A PEPPER'S GHOST PROJECTION SYSTEM FOR LIVE CINEMATIC PERFORMANCES

BACKGROUND

1. Field of the Description

The present description relates, in general, to lighting and projection systems and techniques used to enhance live cinematic performances. More particularly, the present description relates to a display system and method that uses one or more Pepper's ghost assemblies or systems that are configured to provide accurate and balanced lighting in a space viewed by an audience, and the display system and method is particularly well suited for use in providing live performance with cinematic qualities and/or post-production-like effects (or for use in live cinematic performances).

2. Relevant Background

There are numerous entertainment and other settings where it is desirable to create a unique visual display. For example, theme or amusement parks may include rides, walk-through attractions, and theatrical performances where guests (or "viewers") are entertained by a unique visual effect or illusion. In this regard, it is a growing desire to provide a display or experience that is live with one or more human or robotic performers entertaining the audience, but it is also desirable that the live performance include cinematic special effects such as a dramatic and changing background, interaction of the actor with other actors or animated or physical characters, movement of a performer in an unusual or unexpected manner, and so on. Such cinematic effects are provided in movies during post-production and have proven difficult to provide in a live performance environment.

Attempts have been made to use a Pepper's ghost display assembly to insert unique effects into a live performance, but these attempts have not been wholly successful. Pepper's ghost is an illusionary technique used by magicians, by ride or attraction designers, and others to produce a 3D illusion of a latent or ghost-like image. Using a simple piece of plate glass or transparent plastic (e.g., a Mylar sheet) and special lighting techniques, Pepper's ghost systems can make objects appear and disappear within a scene or room. Conventionally, these systems include a main room or scene that is readily viewed by an audience or viewers and a hidden room that is not visible to the audience/viewers. Both rooms may be identical in their physical structure including furniture and other objects except the hidden room may include additional objects or characters such as a ghost. A large piece of glass/plastic or a half-silvered mirror is situated between the viewer and the scene at an angle, such as at about 45 degrees. When the main room is lit and the hidden room is darkened, the viewer only sees the main room as the hidden room does not reflect from the glass and the sheet of glass is itself hard to see as it typically extends across the entire view of the main room.

Pepper's ghost then becomes very visible to the viewer when the entire hidden room or portions such as the ghost or other character are brightly lit. Since only a portion of the light cast upon the ghost or other objects in the hidden room is reflected from the glass/plastic sheet, the reflected images appear as latent or ghostly images relative to the objects in the main room (e.g., the reflected images or images superimposed in the visible room may appear to float). The Pepper's ghost image is a 3D image that may be a still image or animation may be provided such as with animatronics providing the "ghost" or by placing a live actor in the hidden room. In many current systems, a 2D display is used in the hidden room as it is more dynamic and controllable and does not require a live actor or expensive animatronics. However, this results in a 2D image or flat object being displayed or virtually positioned within a 3D set (e.g., the main room). In a broad sense, the Pepper's ghost systems may be thought of as implementing autostereoscopy, which is generally a method of displaying 3D images that can be viewed without the use of headgear or glasses on the part of the user.

There are a number of challenges with using Pepper's ghost techniques within a live performance set or display. For example, there is a demand for creating a live cinematic experience that combines physical scenery with layers of digital media and live performers. However, it is generally very difficult to light or illuminate a person in a dark space, such as the Pepper's ghost hidden room, with a dark or black background without lighting up the background, and the illuminated background becomes visible to the viewers/audience along with the illuminated person. Any projected light will also light background material that may be painted black, which is often enough to overpower an image or object on the actual stage onto which this "black" background image is projected from the hidden space/room. This unwanted display of objects in addition to the "Pepper's ghost" or illuminated person is particular troublesome when the goal of the display designers is to achieve a well-balanced, more perfectly lit, and properly composed image for viewing by the audience/viewers of the main space/stage.

Pepper's ghost assemblies often use simple black cloth materials to try to make displayed elements float or appear onto a stage through a mirror. To avoid overpowering of mirrored background that is lit up by the light spill, lighting of the object/person that provides the Pepper's ghost image was limited to side lighting. Unfortunately, use of side lighting makes it very difficult to achieve desired image brightness as high quality theatrical frontal lighting cannot be used in conventional Pepper's ghost displays.

Hence, there remains a need for techniques for enhancing a live performance with visual and lighting effects that previously were only possible in movies and videos such as through post-production processes. Preferably, the new display techniques and display systems configured to implement these techniques would provide a live cinematic performance for viewers or an audience with better illuminated and balance images and would allow a live performer to appear to interact with other virtual performers (e.g., with objects/performers in a hidden room that are projected into the space/stage where the live performer is located) and projected media and with still or moving physical set elements.

SUMMARY

A display or projection system is described herein that is particularly well-suited for use in providing or displaying a live cinematic performance to one or more viewers (or to an "audience"). The system generally includes a stage or first space that is directly viewable by the audience, and the stage or first space may be illuminated with a stage lighting assembly and includes one or more set elements. One or more human, robotic, or other "live" or physical performers may be positioned on the stage or in the first space and selectively lit or illuminated by light from the stage lighting.

The system also includes at least one Pepper's ghost assembly configured according to the present description to provide a projected image (or Pepper's ghost) with background items in the Pepper's ghost assembly's space (or hidden room) being better hidden from view by the audience. A goal of providing the Pepper's ghost is to create dimensional images in midair or an additional layer that can be turned on or off anytime. The system taught herein enhances the brightness of the system by selectively lighting specific areas and, therefore, clearly identifies background and foreground so as to perfectly match the overall lighting. The brightness of the projected image is preferably matched to or chosen for use with the lighting of performers and set elements on the stage or in the first space. The Pepper's ghost assembly may include one or more high speed projectors or other light sources, a high speed vision system, and retroreflective material (e.g., black or "super black" retroreflective cloth or the like), and these components function in combination to allow the assembly to be operated to selectively light objects and people in the hidden or Pepper's ghost assembly's space without displaying or projecting the background to the viewers/audience of the stage or first space.

In one implementation of the Pepper's ghost assembly, the high speed vision system includes a high speed camera that is co-aligned with the nodal point of one of the light sources (e.g., high speed projectors) such as through a hot mirror. The high speed vision system also may include an infrared (IR) light emitting diode (LED) ring (e.g., a ring of very bright IR LEDs) positioned to surround the lens of the camera and to shine IR light into the space of the Pepper's ghost assembly (or into a second space of the display or projection system that is adjacent to the first space).

In one implementation, all surfaces that are considered background and are not to be projected/displayed are coated or covered with black retroreflective material (such Super Black™ retroreflective material available from IBR/JRC-REFLEX or the like). This material may have a retroreflection coefficient in a desired range (such as 120 to 180 for IR light, such as at or above 150 for IR light, or the like) such that it reflects a lot of light back to the vision system (e.g., to the high speed camera). The vision system perceives this reflected light as being bright or white while the surfaces that are not covered with the retroreflective material appear dark or black. The images captured by the high speed camera are processed to detect or compute what is background and what is not (e.g., what is foreground or a surface that it is desired to illuminate for display or projection to the viewers/audience).

The light source, such as a high speed projector, is operated to project visible light (e.g., white or colored light) onto the non-background surfaces or onto the foreground or selected objects and/or performers. The light sources (e.g., left and right front projectors) provide frontal illumination of the foreground or selected objects and/or performers, and light is projected out of the Pepper's ghost assembly or second space into the first space where it strikes and is reflected from a beamsplitter (or half-mirrored surface that may be a surface on a pane of glass, a planar sheet of plastic (such as Mylar), or other transparent material) and reflected outward to the audience/viewers for viewing concurrently with illuminated objects/performers/surfaces in the first space. During use of the Pepper's ghost assembly, all the surfaces covered with the retroreflective material appear black (or not readily visible) to the audience/viewer (not lit up) while the selected objects and performers in the second space (or "hidden room") are visible or illuminated (lit up).

The brightness of the displayed/projected "Pepper's ghost" can be chosen to match that of the objects and performers in the first space such that they appear to be physically present in the first space or to be less ghostly than was the case with prior Pepper's ghost technologies (unless a lower brightness is desired for a particular effect or display).

More particularly, a display system is provided that is useful for creating live performances with real-time cinematic special effects. The system includes a first space and a first lighting assembly illuminating the first space with first light. The system also includes a second space adjacent to the first space, and a Pepper's ghost assembly that is partially positioned in this second space (e.g., in a room next to a stage that is hidden from view of the audience). The Pepper's ghost assembly includes: (a) a background object in the second space (such as a human or robotic performer/actor); (b) a foreground object in the second space (such as another human or robotic performer/actor that can interact with the background object); (c) a shield (or cover) formed with retroreflective material positioned to cover exposed surfaces of the background object; (d) an infrared (IR) light source projecting IR light into the second space; (e) a camera receiving a portion of the projected IR light reflected from the second space and, in response, capturing an image of the second space; (f) a visible light source projecting visible light into the second space; (g) a beamsplitter positioned in the first space with a surface facing the second space; and (h) a display controller. The controller processes the image captured by the camera to identify surfaces of the foreground object in the image (such as by eliminating the brighter regions that correspond to the retroreflective material). The display controller operates the visible light source to direct the projected visible light onto the identified surfaces of the foreground object, whereby reflected portions of the projected visible light reflected from the foreground object are directed toward the surface of the beamsplitter for reflection into a viewing space along with portions of the first light from the first space.

In some preferred embodiments, the retroreflective material is black retroreflective material. In the same or other embodiments, the visible light source is operated to match a brightness of the reflected portions of the visible light that is reflected from the surface of the beamsplitter to a brightness of the portions of the first light directed into the viewing space. The visible light source may be a digital, high-speed projector that operates to map the projected visible light to the identified surfaces of the foreground objects (e.g., to direct all or most of the visible light onto the foreground object or object to be lit/illuminated to create a Pepper's ghost image in the first space).

In practice, the digital projector and the camera are co-aligned such as with a hot mirror positioned so as to align the digital projector with the camera (e.g., by passing the visible light and reflecting the IR light). The IR light source may be provided as a ring of IR light emitting diodes (LEDs) positioned about a periphery of a lens of the camera, whereby the camera is collocated with the IR light source (e.g., the camera appears to be the source of the IR light so that projected IR light is reflected by the retroreflective material back to the IR ring and collocated camera lens).

In some embodiments, the display system includes an additional or second Pepper's ghost assembly, and this assembly includes: (a) a projection screen positioned in the first space (note, the image can also be projected into the second space and bounce off the two beamsplitters twice to achieve the same results or can be provided with a variety of configurations); (b) a second beamsplitter positioned in the first space at a 45 degree angle to the projection screen and parallel to and offset from the beamsplitter of the Pepper's ghost assembly; and (c) a projector projecting images onto the projection screen concurrently with operating of the visible light source to project the visible light into the second space.

DETAILED DESCRIPTION

The present description is directed display or projection systems that include one or more Pepper's ghost assemblies to project or insert imagery into a live performance space. For example, a live performance may be enhanced with cinematic-type effects by positioning one, two, or more Pepper's ghost assemblies adjacent to the main stage or space where the live performance is occurring. Such enhancements may include projecting images of additional performers into the space about the live performer on the main stage, and these projected images may be perceived by the audience or viewers as physically-present performers through frontal lighting combined with light balancing (e.g., matching a brightness of the displayed imagery with the lighting of a performer on the main stage or first space). The added or projected performer may be able to do gravity-defying and unique stunts through background objects and additional performers interacting with the projected performer that are hidden from view using the techniques described herein. Additionally, moving and changing scenery elements can be concurrently projected or inserted into the main stage/first space through the use of a second (or more) Pepper's ghost assembly.

Figure 1:
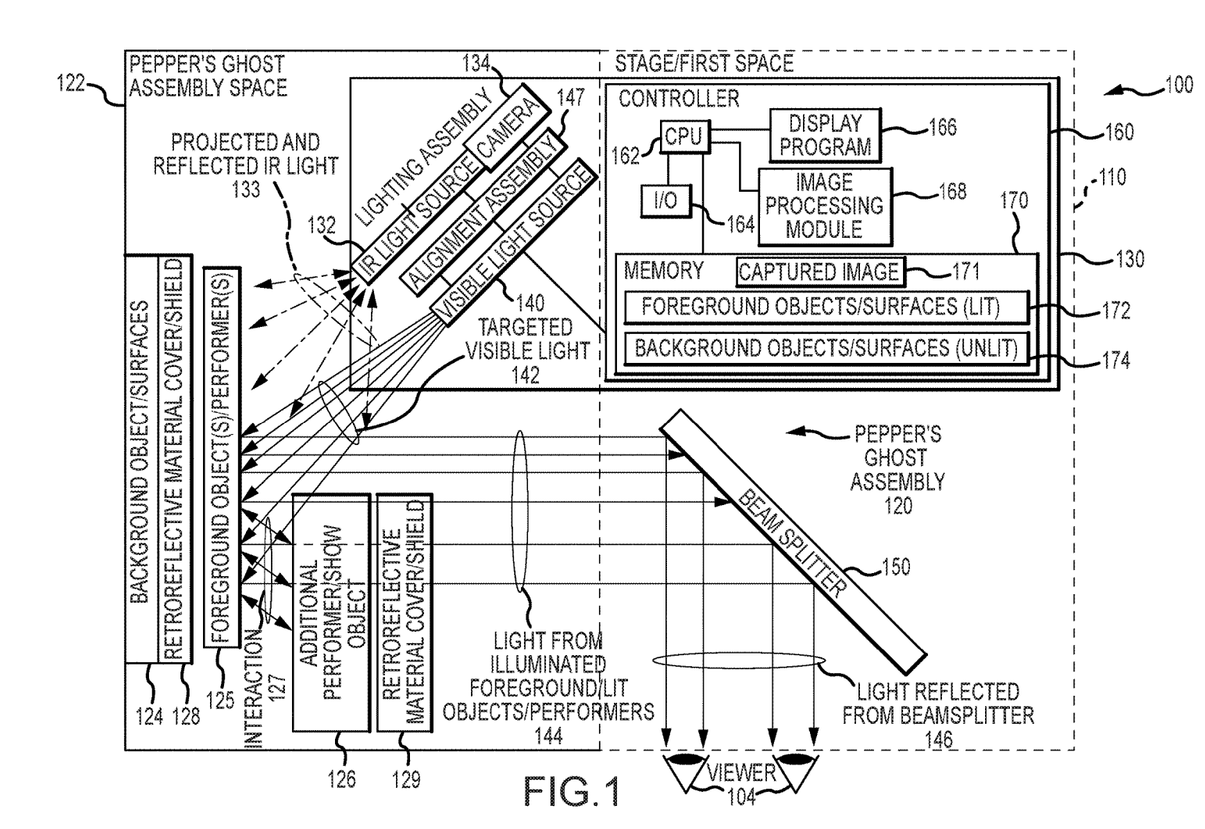
FIG. 1 is a functional block diagram of a projection or display system that includes a Pepper's ghost assembly of the present description.

Prior to turning to more complex examples, it may be useful to discuss a relatively simple display or projection system that includes a single Pepper's ghost assembly (with the understanding that systems often will include two or more Pepper's ghost assemblies). FIG. 1 illustrates a functional block diagram of a projection or display system 100 of the present description. As shown, the system 100 includes a stage or first space 110 that is directly viewable by a viewer/audience 104, and this first space 110 typically would include its own lighting system or assemblies (not shown in FIG. 1) to illuminate physical scenery and any live performers (human actors, robotic characters, and so on also not shown in FIG. 1 to simplify description of the system 100) so that the set/scenery elements and physical, live performers are visible to the viewer 104.

To allow additional imagery to be viewed concurrently by the viewer 104, the system 100 includes a Pepper's ghost assembly 120 positioned adjacent to the stage/first space 110 (but, note, a second stage/space may be used instead with light bounces of two beamsplitters or the like to achieve similar results and other configurations will be apparent to those skilled in the arts). Specifically, the assembly 120 includes a space 122 that may be defined by one, two, three, or more walls or barriers that are designed to block a sightline of the viewer 104 into the space 122 and to allow light 144 from illuminated objects to exit the space 122 and be directed/projected into the stage/first space 110. This light 144 is reflected as shown at 146 from a first surface of a beamsplitter 150 positioned in the stage/first space 110 toward audience/viewers 104 (in another space adjacent the stage/first space 110).

The beamsplitter 150 may take a variety of well-known forms to practice the Pepper's ghost assembly 120 such as a pane of glass, a sheet of a transparent plastic (such as Mylar or the like), and so on, and, typically, the beamsplitter 150 is arranged at an angle as shown relative to the audience/viewer 104 such as at 45 degrees. A portion of the light 144 is reflected as shown at 146 while another portion is lost as it passes through the beamsplitter 150 (e.g., 50 percent may be lost), and, hence, it may be desirable to increase the brightness of the light 144 so as to have it better match light from illuminated objects/performers in the stage/first space (e.g., by lighting provided in this first/stage space). The beamsplitter 150 typically is sized and shaped to match the size and shape of the opening to the Pepper's ghost assembly space 122 (or to extend from a floor to a ceiling in the space 110 and from a first to a second wall (in some cases)).

The Pepper's ghost assembly (or visual effect assembly) 120 includes background objects and surfaces 124 in the space 122, and the assembly 120 also includes one or more foreground objects and/or performers 125. During operation of the assembly 120, it is desirable for the background objects and surfaces 124 to be hidden from view by the viewer 104 while, in contrast, it is desirable for the foreground objects and/or performers 125 to be visible to the viewer 104 via the light 146 reflected from the beamsplitter 150. Further, additional performers and show objects 126 may be provided in the space 122 to interact (as shown with arrows 127) with the foreground objects/performers 125 so to achieve unique movements and positioning of the foreground objects/performers 125 (e.g., to allow a performer to be lifted off the floor/ground in space 122, to move so as to defy gravity, to perform gymnastic, dance, or martial arts-type move, and so on), and it is desirable for these additional performers/show objects 126 also to be hidden from viewing by the viewer 104.

To hide surfaces and objects in the space 122 from viewer 104, the assembly 120 is configured to project visible light 142 in a targeted manner onto only (or substantially only) the surfaces and objects 125. In this way, only light 144 from these foreground or illuminated (lit up or lit) objects and performers 125 is projected outward from the space 122 into the stage/first space 110 for reflection as shown at 146 by the beamsplitter 150 (or its first or facing surface) to the viewers/audience 104. To achieve such hiding of the background objects/surfaces 124 and additional performers/show objects 126, these elements 124, 126 are covered with a retroreflective material cover or sheet 128 and 129. In other words, any surface that is not to be displayed/projected as part of the "Pepper's ghost" image in light 144 is covered or shielded with the cover/shield 128, 129, which is formed of a retroreflective material. In some preferred embodiments, the retroreflective material is chosen to be black retroreflective material (e.g., as a flexible sheeting), and, in the case of a human performer 126, the cover/shield 129 may take the form of clothing or a suit that is worn during operations of the assembly 120. In one specific implementation, the material utilized was Super Black™ retroreflective material from JRC REFLEX Reflective Technologies but other similar black retroreflective materials may be used (such as those using bead, mirror, or other surfaces to provide the retroreflective qualities while other embodiments may us an active LED surface such as an IR edge lit acrylic sheet or the like). The surfaces of the foreground objects and performers (or the surfaces that are to be included in the projected image 144) are left uncovered/unshielded by such retroreflective material.

The assembly 120 is further adapted to determine or calculate the locations of the background objects/surfaces 124 and the additional performers/objects 126 and the locations of the foreground objects/performers 125. This is achieved by determining which surfaces are covered with retroreflective shields/covers 128, 129 and which ones are not (i.e., foreground objects/performers 125 that are to be included in the projected image via light 144). To this end, the assembly 120 includes a lighting assembly 130 with a visible light source (or source of visible light) 140 that is operated by a controller 160 to direct targeted light 142 onto the foreground objects/performers 125 (and not onto the other surfaces).

Further, the lighting assembly 130 includes an infrared (IR) light source 132 and a camera (e.g., a digital video camera) 134. The IR light source 132 is typically configured to project IR light generally along the axis of the lens of the camera 134, and the retroreflective material covers/shields 128, 129 act to reflect this light directly back along the same axis (or in same direction) to the camera 134 as shown with arrows 133 (showing both the projected and reflected IR light 133 that travels along the same paths). To this end, the IR light source 132 may take the form of a ring of one-to-many, bright-to-very bright, IR light emitting diodes (LEDs) that are positioned to extend about the periphery of the lens of the camera 134. The captured image (e.g., a still or video image) is communicated or transferred to the controller 130 where it is stored in memory 170 prior to processing to identify the foreground and background objects/surfaces 172, 174 (which may also be provided as separate images).

The controller 130 includes one or more processors 162 that manage memory 170 and also input/output devices 164, which may be used by an operator to initiate operations of the assembly 120 and/or to select or load a particular display program 166. The processor 162 runs or executes code, software, or programming in memory 170 to provide the functionality of the display program 160 and of the image processing module 168. The display program 160 may act to generate control signals for the visible light source 140 indicating the timing of the projection of the visible light 142 and its brightness (e.g., to match lighting of objects/performers in the stage/first space 110). The display program 160 may also use the definition of the foreground objects/surfaces 172 in memory 170 to instruct the visible light source 140 to direct or target its output light 142 onto the surfaces of the foreground objects/performers 125.

To this end, the visible light source 140 may take the form of a digital projector such as a high-speed, higher brightness (such as 800 to 1400 or more lumens) projector having the ability to project visible light (such as white or other colored light) onto select surfaces (such as surfaces of objects/performers 125) while projecting black onto other surfaces (such as surfaces of objects/performers 124, 126). Further, it is typically desirable for the visible light source 140 to be co-aligned with the camera 134 (with their two axes aligned) to allow the projected light 142 to be properly mapped to areas in the captured image 171 generated by the camera 134 via receipt of the IR light 133. The lighting assembly 130 may include an alignment member or assembly 142 that functions to align the output 142 of the visible light source 140 with the light input 133 to the camera 134 (e.g., to align an axis of the camera lens with an axis of the projector lens). In one useful embodiment, a hot mirror or similar device is used to provide such alignment (as discussed below).

When an image 171 is captured, the image processing module 168 acts to process the image 171 to identify the foreground objects/performers 125. In the image 171, the surfaces that are covered or shielded with the covers/shields formed of the black retroreflective material 128, 129 appear lighter colored (e.g. white) or brighter than the uncovered or unshielded surfaces of the foreground objects/performers 125 which appear darker colored (e.g., gray-to-black) or less bright. Hence, the image processing module 168 can be designed to compare the brightness/coloring of the various surfaces in the captured image and to select as foreground surfaces 172 those that are relatively dark (lower brightness levels) or darker in color (or the opposite process may be used to identify the background surfaces with all other surfaces being marked as foreground surfaces to be illuminated).

These surface identifications 172, 174 can then be provided to the display program 166 for use in generating a projection mapping for operating the visible light source 140 (e.g., a projector) to project the visible light 142 onto the surfaces of the foreground objects/performers 125 (or toward the locations of these objects/performers when the image 171 was captured). As a result, light 144 from (e.g., reflected off or from) the surfaces of the foreground objects/performers 144 is directed into the stage/first space 110 where it strikes the facing surface of the beamsplitter 150 such that it is reflected (in part) toward the viewers/audience 104 as shown with arrows 146 (note, this image actually appears to be behind the beamsplitter 150 at that same distance). In this way, the viewers/audience 104 perceive, through a displayed/projected Pepper's ghost image, that the illuminated foreground objects/performers 125 are present at a location in the stage/first space 110 (as determined by the distance from the beamsplitter 150 to the objects/performers 125 in the space 122). This illusion is enhanced by proper location of the displayed image within the space 110 as well as matching the brightness of the light 146 to match that of light reflected from objects/performers in the stage/first space 110.

Figure 2A:
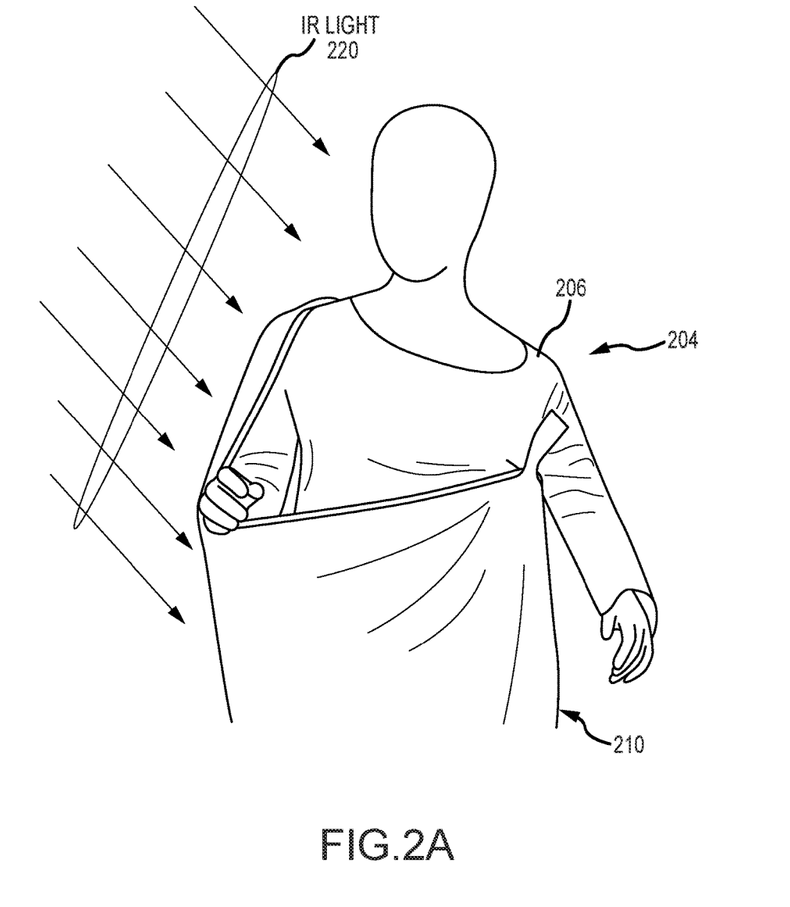
FIGS. 2A and 2B illustrate a performer with a portion of their body covered or shielded by black retroreflective material and a portion unshielded/uncovered and a captured image of the performer when illuminated with IR light.

FIG. 2A illustrates the body 204 such as that of a performer who may be positioned within a Pepper's ghost assembly space. In this example, it may be desirable for only a portion of this performer's body 204 to be illuminated and provided as a Pepper's ghost image in a stage or first space observed by an audience/viewers. To achieve this goal, the target surfaces or portions 206 of the body 204 to be illuminated are left uncovered or unshielded while other surfaces or portions of the body 204 to be hidden from view are covered/shielded with a cover/shield 210 formed of or including a retroreflective material (e.g., a sheet of black retroreflective material). Then, during operation of a Pepper's ghost assembly, such as assembly 120 of FIG. 1, IR light is used to illuminate the body 204 of the performer (all surfaces or all surfaces exposed to an IR light source). This results in the IR light 220 being reflected in a diffuse manner from the targeted/uncovered portion 206 of the body 204 while the IR light 220 is effectively reflected back from the cover/shield 210 directly back to the IR source.

Figure 2B:
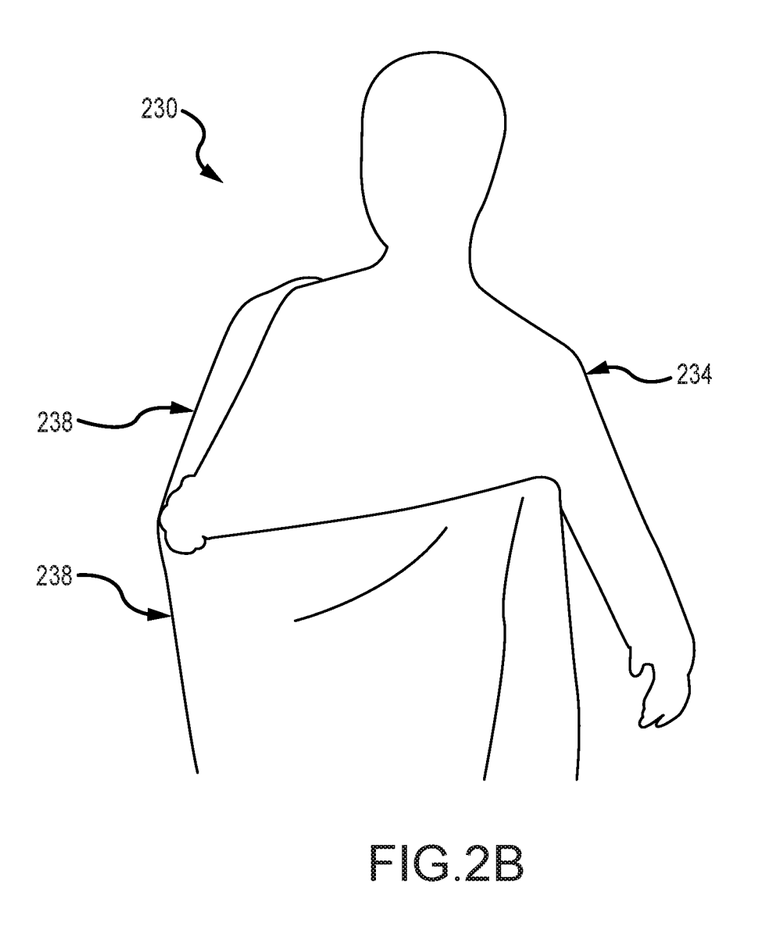

As discussed with regard to system 100 of FIG. 1, a camera is provided that is aligned with the IR light source. The camera is operated to capture an image 230 as shown in FIG. 2B of the IR-illuminated body 204. As shown at 234, the surfaces of the uncovered, targeted portion 206 of the body 204 appear dark (gray-to-black in color) while the surfaces of the covered with the retroreflective material cover/shield 210 appear brighter (whiter in color) as shown at 238. The image 230 can then be processed (e.g., in near real time with the capture of image 230) to determine which areas/portions 234 are foreground surfaces (e.g., surfaces to be illuminated with visible light) and which areas/portions 238 are background surfaces (e.g., surfaces not targeted for illumination with visible light or targeted for being hidden or obscured in the Pepper's ghost image). Then, while not shown, this mapping of foreground and background (or illuminated/lit and non-illuminated/unlit) surfaces or objects in the captured image 230 is provided to a display controller to operate a visible light source (e.g., a high-speed projector) to project visible light onto the areas/portions 206 of the body 204 that are not covered by cover/shield 210 (or that are uncovered/unshielded with retroreflective material).

Figure 3:
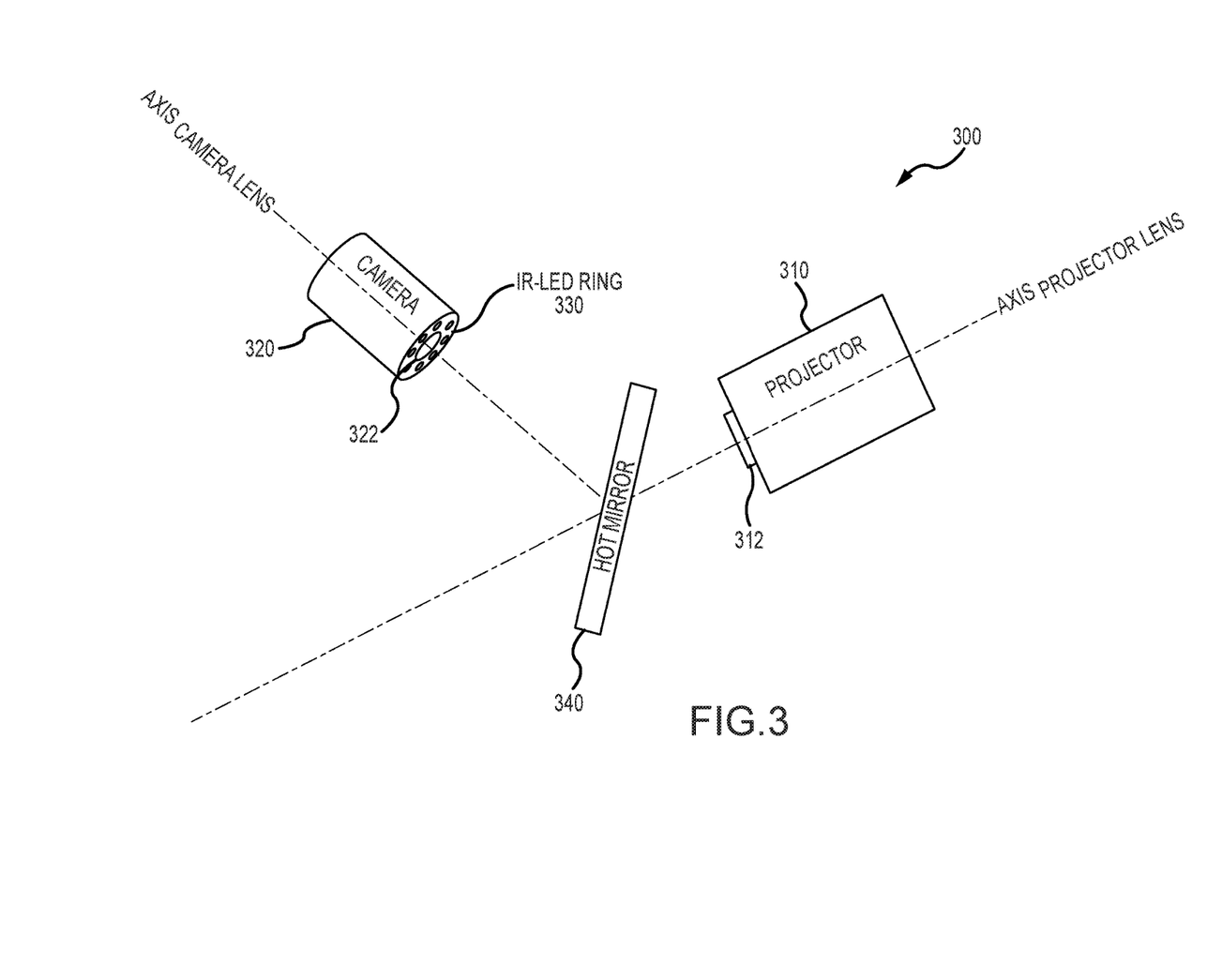
FIG. 3 illustrates a functional block or schematic of a lighting assembly that may be used to implement a Pepper's ghost assembly of the present description such as within the system of FIG. 1.

FIG. 3 illustrates one useful embodiment of a lighting assembly 300 for use in a Pepper's ghost assembly to selectively illuminate surfaces of objects/performers (e.g., foreground objects) in the associated space for inclusion in a displayed/projected Pepper's ghost image. As shown, the assembly 300 includes a projector 310 that is utilized as a visible light source, and the projector 310 has an output lens (or optical element) 312. During operations, visible light is output from the lens 312 along central axis, $Axis_{Projector\ Lens}$. The lighting assembly 300 further includes a video camera 320 with a lens 322 having a central axis, $Axis_{Camera\ Lens}$. An IR-LED ring 330 is positioned about the periphery of the camera lens 322 and acts as an IR light source for the assembly 300.

The lighting assembly 300 further includes an alignment device 340 in the form of a hot mirror. The hot mirror 340 acts, during operations of the lighting assembly 300, to allow visible light output from the projector 310 to pass, and the hot mirror 340 further acts to reflect IR light output from the IR-LED ring 330 along the axis, $Axis_{Projector\ Lens}$, of the projector 310. Reflected IR light, such as from surfaces covered in black retroreflective material covering surfaces in a space of a Pepper's ghost assembly including the lighting assembly 300, is reflected back to the lens 322 along axis, $Axis_{Camera\ Lens}$. In this manner, the projector 310 and the camera 320 are co-aligned within the assembly 300.

Figure 4:
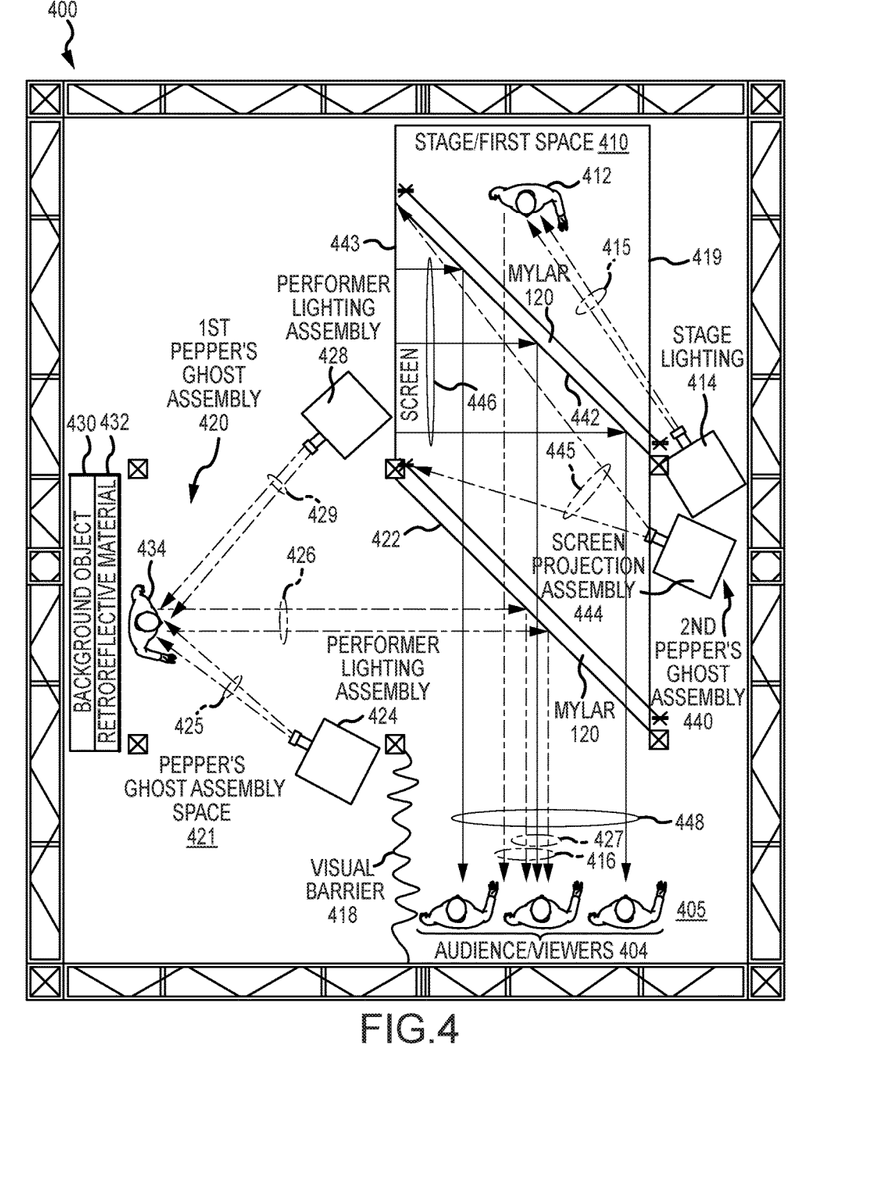
FIG. 4 illustrates a top schematic view of another embodiment of a projection or display system that includes first and second Pepper's ghost assemblies to present a unique mixture of images to an audience observing a stage/first space.

In some cases, it may be desirable to include two or more Pepper's ghost assemblies in a display/projection system to allow the show or display designer to create cinematic-like visual effects. FIG. 4 illustrates an exemplary display or projection system 400 that includes first and second Pepper's ghost assemblies 420 and 440 to allow a show/display designer to concurrently and/or sequentially insert two types of images and/or media into imagery perceived by an audience or set of viewers 404. The audience 404 is positioned in an offset or offstage viewing space 405 that provides them with a direct line of sight into a stage or first space 410 where set elements (which may be actuated for movement) and live performers (human actors, robotic devices/characters, and the like) such as performer 412 may be located during operation of the system 400 to provide a show or display.

Stage lighting 414 is provided for illuminating the stage/first space 410 including the performer 412 and set elements (e.g., scenery, moving set pieces if present, and the like) as shown with light 415 that strikes the performer 412 to allow the performer (and set elements in space 410) to be visible as shown with arrows/light 416 by the viewers/audience 404 in viewing space 405. Barriers 418, 419 (e.g., light blocking curtains, walls, screens, or the like) are included in the system 400 to prevent the viewers/audience 404 from being able to see portions of the system 400 including portions of the first and second Pepper's ghost assemblies 420, 440. Note, the performer 412 is visible by the audience/viewers 404 as light is able to pass from the stage/first space 410 through the two beamsplitters 422, 442 of the assemblies 420, 440 as these are formed of sheets or panes of transparent (or half-mirrored) material such as glass, Mylar, or the like, and the beamsplitters 422, 442 may extend orthogonal to the floor/ground of stage/first space 410 and at a 45 degree angle to the line of sight of viewers 404 from space 405 into the stage/first space 410 to better disguise their presence.

The first Pepper's ghost assembly 420 may take a form similar to that of the assembly 120 of FIG. 1 and be operated to insert a Pepper's ghost image (e.g., via light 448) into the stage/first space 410 viewable with images/light 416 of the performer 412 and first space set elements. As discussed above, this image can be quite bright and higher quality than prior "ghost" images due to the combination of black retroreflective material covering background or unlit surfaces/objects and frontal (rather than merely side) lighting with one or more visible light sources that target the surfaces/objects not covered or shielded with the black retroreflective material.

To this end, the first Pepper's ghost assembly 420 includes a space or room 421 that is adjacent (or adjoining) and open to the stage/first space 410 (but hidden from audience view with barrier 418). Background and other objects 430 that are in the space 421 but that are not to be included in the Pepper's ghost image provided by light 448 are covered or shielded with a layer/sheet of black retroreflective material 432. Performers or other "foreground" objects 434 are left unshielded or uncovered with retroreflective material. As a result, the IR light-based foreground and background determination can be performed, as discussed above with reference to FIGS. 1-3, with components (e.g., an IR light ring, a digital camera, and hardware/software for processing the captured images) provided in the first and second performer lighting assemblies 424, 428.

The first and second performing lighting assemblies 424, 428 further include a visible light source (e.g., a high speed projector) that is co-aligned with the camera, and the assemblies 424, 428 are positioned to provide right and left frontal lighting on the performer/foreground object 434. Particularly, the visible light sources in assemblies 424, 428 can be concurrently operated or separately operated (e.g., to provide two views of the performer 434) to project visible light 425, 429 onto targeted surfaces of the performer/object 434 that are not covered with retroreflective material so that these surfaces were determined to be foreground surfaces (i.e., surfaces to be lit or illuminated). This light 425, 429 is reflected as shown at 426 from the surfaces of the lit performer/foreground object 434 so as to be directed or projected into the stage/first space 410.

The light 426 strikes a surface of the beamsplitter 422 that is facing the space 421 and also the audience/viewing space 405, and the beamsplitter 422 reflects the light 426 as shown with arrows 427 toward the viewing space 405 (again, as with light 146 in FIG. 1, the image provided by light 427 appears to the viewer to be on the other side of the beamsplitter 422 at a distance corresponding with a distance between the splitter 422 and actor 434) such that a first Pepper's ghost image of the performer/foreground object 434 is visible by the viewers/audience 404 (e.g., concurrently with light from the performer/set pieces 412 in the stage/first space). The brightness of the light 427 may be matched (e.g., within 10 percent or more preferably within 5 percent) to the brightness of the light 416 from the first/stage space and performer 412 to achieve a desirable visual effect/display (e.g., to cause the performer 434 to appear to be physically in the space 410 and not be as "ghostly").

The system 400 further includes a second Pepper's ghost assembly (or image display assembly) 440. The assembly 440 includes a projection screen (or surface) 443 within the stage/first space 410 along with the second beamsplitter 442. A screen projection assembly 444 that may include a digital projector adapted for projecting light 445 to display still or animated images on the screen 443, and content of the still or animated images may be chosen to achieve a desired visual effect when viewed concurrently with (or separately/sequentially with) the performer/set elements 412 in space 410 and objects/performers 434 in the space of the first Pepper's ghost assembly 420. Light 446 from the screen 443 strikes the surface of the beamsplitter 442 that is facing the screen 443 (e.g., is at a 45 degree angle to the planar surface of the screen 443) and also the viewing space 405 and viewers 404 such that light 448 reflected from the beamsplitter 442 is visible by the viewers 404 (again, as with light 427 (and light 146 in FIG. 1), the imagery (e.g., animated or still background content) provided by light 448 appears to the viewer to be on the other side of the beamsplitter 442 at a distance corresponding with a distance between the splitter 442 and screen 443). In this way, projected images from screen projection assembly 444 can be viewed as if in the stage/first space 410 (e.g., as if on the back wall or another surface of the stage/first space 410, as if at a particular location relative to the performer 412, as if at a particular location in the space 410 relative to a location of the Pepper's ghost image of the performer/foreground object 434 from the first Pepper's ghost assembly 420). In another embodiment, the media from the second Pepper's ghost can be live. For example, a third performance space can be in the unutilized corner space, where the performance is captured live and projected on the second Pepper's ghost media space. It can enable video-based effects like scaling down the person/performer or distorting him/her and so on (in other words, animated media can, instead or additionally, be live captured).

The particular hardware and/or software utilized to implement the system 400 may be varied to achieve a desired result and effects, but it may be useful to provide some exemplary components that may provide useful to those skilled in the arts. For example, the left and right performer lighting assemblies 424 and 428 may be include a Christie Boxer 4K30 projector or the like to provide the visible light on surfaces uncovered by black retroreflective material. The lighting assemblies 424 and 428 may each include a desktop or other PC for performing silhouette extraction by processing the IR image captured by a camera (e.g., a motion capture camera such as a Vicon T40 optical capture camera, a Bonito CL-400 high speed camera, OptiTrack Flex 3, or the like) and by software such as capture and live retargeting software (e.g., Vicon Tracker 3, Vicon Pegasus, OptiTrack Motive, or the like).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

With prior Pepper's ghost systems, the designer of the display or projection system would not be able to create a live cinematic experience. In contrast, the new Pepper's ghost assemblies taught herein allow the system designer to provide a stage performance with visual effects that are similar those provided in action and other movies provided using green screen techniques. In the projection/display systems described above, reality can be bent in theatrical ways normally reserved to filmmakers through the combination of layers of projected digital media (from a projection-based (or media-based) Pepper's ghost assembly), live motion tracking (e.g., of the performers in the Pepper's ghost assembly and/or in the stage/first space), moving scenic elements (in the Pepper's ghost assembly space and/or stage/first space), and selectively lit performers (e.g., one performer is wholly or partially lit with visible light while a second performer is wearing a black retroreflective material uniform/clothes and is not illuminated with visible light). Further, some embodiments are adapted to allow camera angles and perspective to be changed in one or more of the Pepper's ghost assemblies. Performers can perform stunts and, instead of using wires, one can use a hand-to-hand invisible act through a performer or automation system (e.g., a show object) that is dressed or covered/shielded in black retroreflective material (e.g., a fabric sheet or cloth, paint, tape, or other form of such material).

We claim:

1. A display system for use in creating live performances with cinematic special effects, comprising:
    a first space;
    a first lighting assembly illuminating the first space with first light;
    a second space adjacent to the first space; and
    a Pepper's ghost assembly comprising:
        a background object in the second space;
        a foreground object in the second space;
        a shield comprising retroreflective material positioned to cover exposed surfaces of the background object;
        an infrared (IR) light source projecting IR light into the second space;
        a camera receiving a portion of the projected IR light reflected from the second space and, in response, capturing an image of the second space;
        a visible light source projecting visible light into the second space;
        a beamsplitter positioned in the first space with a surface facing the second space; and
        a display controller processing the image captured by the camera to identify surfaces of the foreground object in the image, wherein the display controller operates the visible light source to direct the projected visible light onto the identified surfaces of the foreground object, whereby reflected portions of the projected visible light reflected from the foreground object are directed toward the surface of the beamsplitter for reflection into a viewing space along with portions of the first light from the first space.

2. The system of claim 1, wherein the retroreflective material is black retroreflective material.

3. The system of claim 1, wherein the visible light source is operated to match a brightness of the reflected portions of the visible light reflected from the surface of the beamsplitter to a brightness of the portions of the first light.

4. The system of claim 1, wherein the visible light source comprises a digital projector mapping the projected visible light to the identified surfaces of the foreground objects.

5. The system of claim 4, wherein the digital projector and the camera are co-aligned.

6. The system of claim 5, wherein the Pepper's ghost assembly further comprises a hot mirror positioned to align the digital projector with the camera.

7. The system of claim 1, wherein the IR light source comprises a ring of IR light emitting diodes (LEDs) positioned about a periphery of a lens of the camera, whereby the camera is collocated with the IR light source.

8. The system of claim 1, wherein the foreground and background objects each comprises at least one human or robotic performer and wherein the visible light source is positioned between the beamsplitter and the foreground object to provide frontal lighting of the foreground object.

9. The system of claim 1, further comprising an additional Pepper's ghost assembly comprising:
a projection screen positioned in the first space;
a second beamsplitter positioned in the first space at a 45 degree angle to the projection screen and parallel to and offset from the beamsplitter of the Pepper's ghost assembly; and
a projector projecting images onto the projection screen concurrently with operating of the visible light source to project the visible light into the second space.

10. A system for enhancing a live performance with cinematic special effects, comprising:
a first lighting assembly illuminating a first space with first light; and
a display assembly at least partially positioned in a second space proximate to the first space, the display assembly comprising:
a first object in a second space;
a second object in the second space;
a shield comprising black retroreflective material, wherein the shield covers surfaces of the first object;
a first light source projecting IR light into the second space;
a camera capturing an image of surfaces in the second space illuminated by the projected IR light;
a second light source projecting visible light into the second space;
a beamsplitter positioned in the first space with a surface facing the second space; and
a display controller processing the image captured by the camera to identify surfaces of the second object, wherein the display controller operates the second light source to project substantially all of the visible light onto the identified surfaces of the second object, whereby reflected portions of the projected visible light reflected from the second object are directed toward the surface of the beamsplitter for reflection into a viewing space concurrently with the first light from the first space.

11. The system of claim 10, wherein the second light source comprises a projector generating output light mapped to the identified surfaces of the second object.

12. The system of claim 11, wherein axes of lenses of the projector and the camera are aligned.

13. The system of claim 12, wherein the display assembly further comprises a hot mirror positioned to align the lenses of the projector and the camera.

14. The system of claim 10, wherein the first light source comprises a ring of IR LEDs positioned about a periphery of a lens of the camera.

15. The system of claim 10, further comprising an additional display assembly comprising:
a projection screen positioned in the first space;
a second beamsplitter positioned in the first space parallel to and offset a distance from the beamsplitter of the first display assembly; and
a projector projecting images onto the projection screen concurrently with operating of the second light source to project the visible light into the second space.

16. A display system for displaying images to viewers in a viewing space, comprising:
a beamsplitter positioned with a planar surface at a 45 degree angle to the viewing space;
a foreground object or performer;
a background object proximate to the foreground object or performer;
a shield covering surfaces of the background object, wherein the shield comprises black retroreflective material and wherein surfaces of the foreground object or performer remain uncovered by the shield;
an IR light source projecting IR light onto the background object, the shield, and the foreground object or performer;
a camera capturing an image of surfaces illuminated by the IR light;
a processor processing the captured image to identify a subset of the surfaces illuminated by the IR light that are associated with the foreground object or performer; and
a projector selectively projecting visible light onto the subset of the surfaces to illuminate the foreground object or performer, wherein light reflected from the subset of the surfaces is directed onto the planar surface of the beamsplitter for reflection into the viewing space.

17. The system of claim 16, wherein axes of lenses of the camera and the projector are aligned.

18. The system of claim 16, wherein the IR light source is collocated with a lens of the camera and wherein the black retroreflective material has a retroreflection coefficient of at least 150 for IR light.

19. The system of claim 16, wherein the processor generates a projection map defining locations of the subset of the surfaces relative to a location of the projector.

20. The system of claim 16, further comprising:
a projection screen;
a second beamsplitter positioned parallel to and offset a distance from the beamsplitter; and
a second projector projecting an image onto the projection screen concurrently with operating of the projector to project the visible light.

* * * * *